United States Patent [19]

Leitzel

[11] 4,262,928
[45] Apr. 21, 1981

[54] GOLF CLUB CARRIER
[75] Inventor: Ammon M. Leitzel, Portland, Oreg.
[73] Assignee: Jarman Company, Milwaukie, Oreg.
[21] Appl. No.: 51,694
[22] Filed: Jun. 25, 1979

Related U.S. Application Data

[60] Continuation of Ser. No. 844,066, Oct. 20, 1977, abandoned, which is a division of Ser. No. 760,912, Jan. 21, 1977, Pat. No. 4,136,724.

[51] Int. Cl.³ .............................................. B62B 1/06
[52] U.S. Cl. ................................. 280/645; 280/47.26; 280/DIG. 6
[58] Field of Search ........... 280/DIG. 6, 47.19, 47.26, 280/702, 700, 721, 652, 655, 38, 491 A, 491 B, 491 D, 641–646, 648–650; 150/1.5 R, 1.5 A, 1.5 B, 1.5 C; 220/710

[56] References Cited

U.S. PATENT DOCUMENTS

| 1,555,772 | 9/1925 | Stripe | 150/1.5 B X |
| 2,415,392 | 2/1947 | Morehouse | 280/645 |
| 2,556,814 | 6/1951 | Love | 280/DIG. 6 |
| 2,777,707 | 1/1957 | Cloes | 280/646 |
| 3,014,760 | 12/1961 | Gard | 280/645 X |
| 3,083,029 | 3/1963 | Russell | 280/DIG. 6 |
| 3,162,461 | 12/1964 | Krell | 280/47.26 X |
| 3,191,957 | 6/1965 | Meiklejohn | 280/DIG. 6 |
| 3,265,402 | 8/1966 | Snyder | 280/DIG. 6 |
| 3,459,434 | 8/1969 | Puldney | 280/DIG. 6 |
| 3,506,280 | 4/1970 | Coupe | 280/DIG. 6 |
| 3,709,514 | 1/1973 | Kaczmarek | 280/DIG. 6 |
| 3,735,997 | 5/1973 | Seibold et al. | 280/DIG. 6 X |
| 3,964,764 | 6/1976 | Rickardsson | 280/702 |
| 4,062,564 | 12/1977 | Schimmeyer | 280/DIG. 6 |
| 4,126,327 | 11/1978 | Taber | 280/DIG. 6 |
| 4,153,264 | 5/1979 | Pfister | 280/DIG. 6 X |

Primary Examiner—John J. Love
Assistant Examiner—Norman L. Stack
Attorney, Agent, or Firm—Klarquist, Sparkman, Campbell, Leigh, Hall & Whinston

[57] ABSTRACT

A club container is removably mounted on a cart and has a bottom notch receiving a crossrod of the cart and an upper, releasable latch. The club container has a pleated, flexible plastic irons separator and has long tubular sockets receiving shafts of the woods. The cart has a frame of two U-shaped tubes secured together by rivets which also pivot a U-shaped wheel suspension tube carrying pivot pins on which are pivoted circle-carrying arms biased by torsion spring rods secured to the tube. To form a folding linkage, a pair of rods having bent-over, lower end portions trapped in the wheel suspension tube are held together with bent-over, upper end portions trapped in a block secured to a handle. Two pairs of legs pivotally secured to a seat and having ends hooked into the frame of the cart to mount the seat, along with a pair of braces hooked into the frame and slidable along one of the pairs of rods, for overcenter movement between a seating position and a folded position.

9 Claims, 13 Drawing Figures

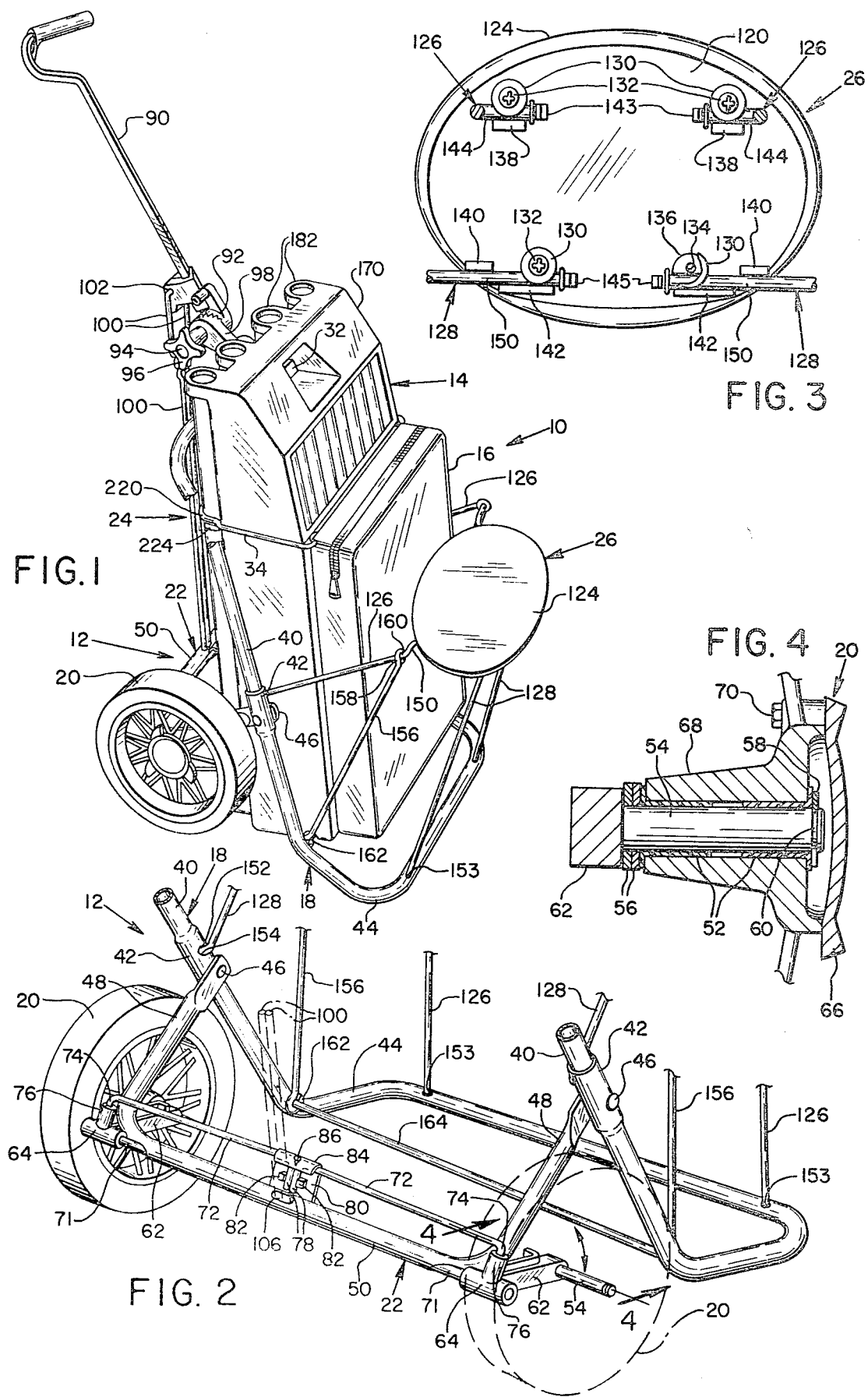

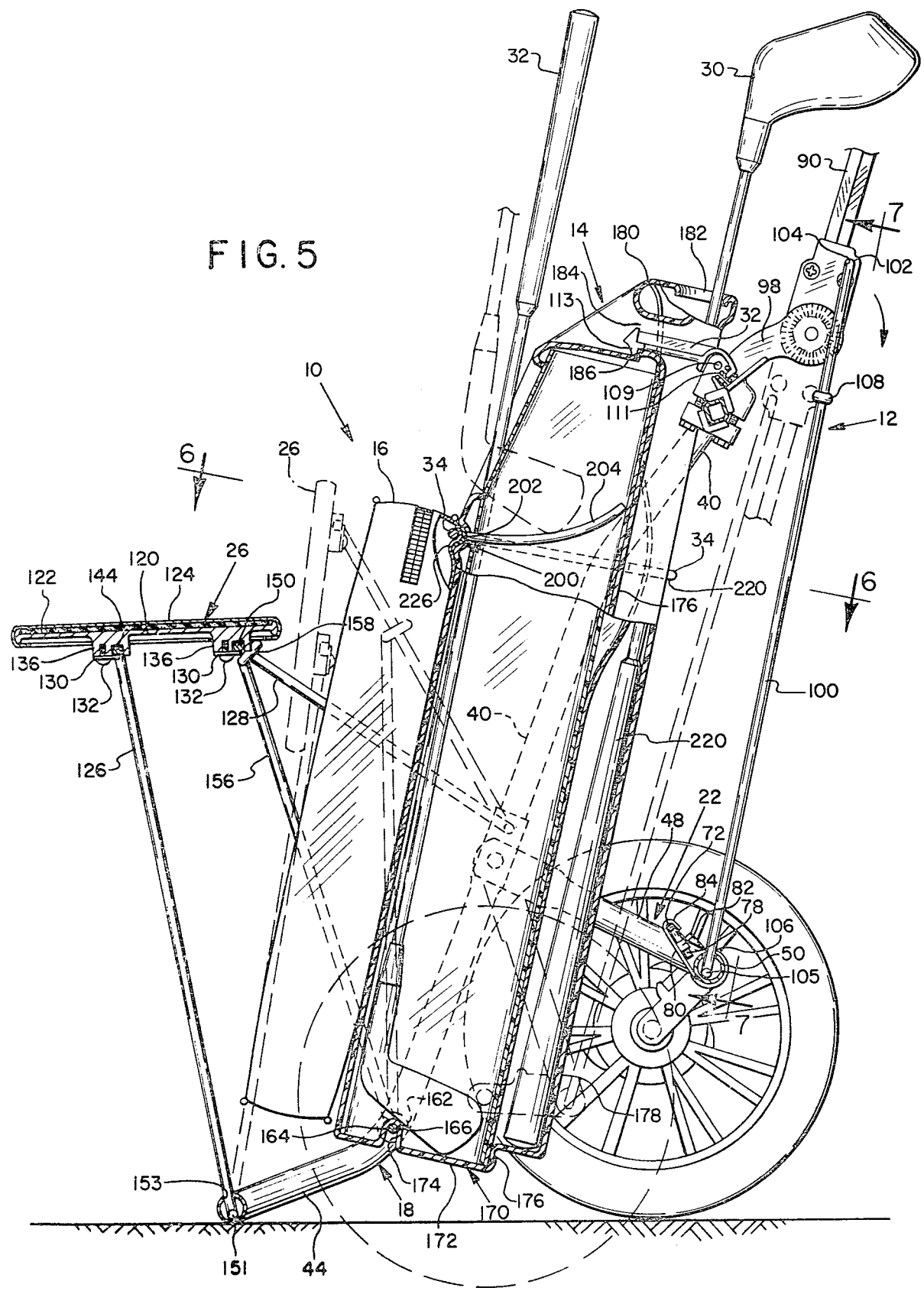

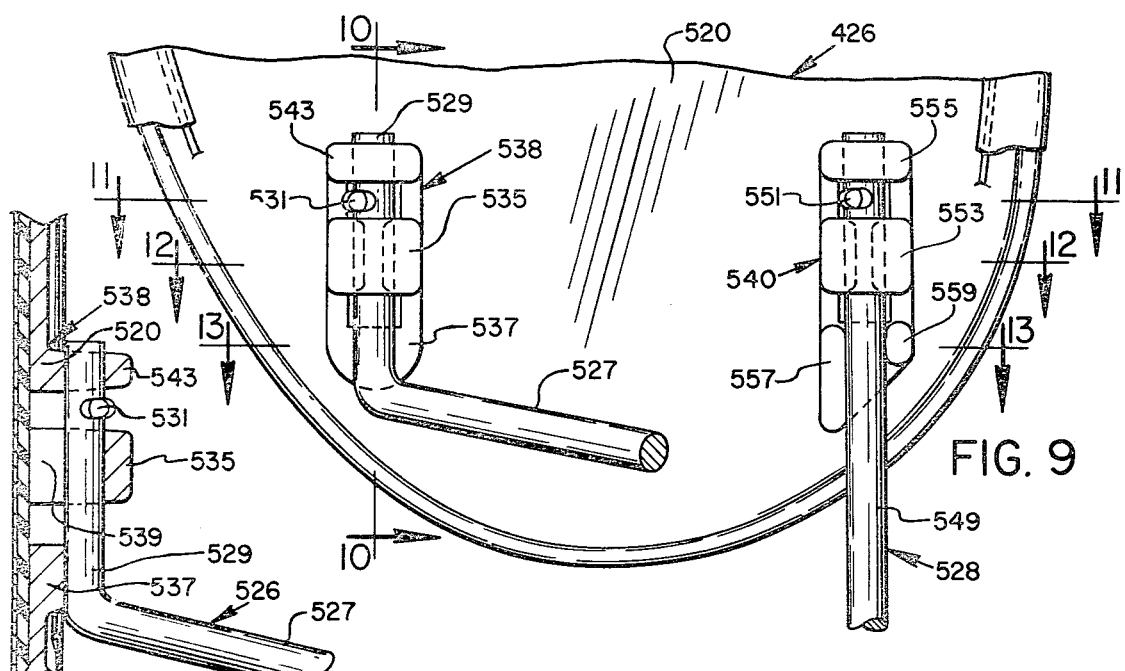
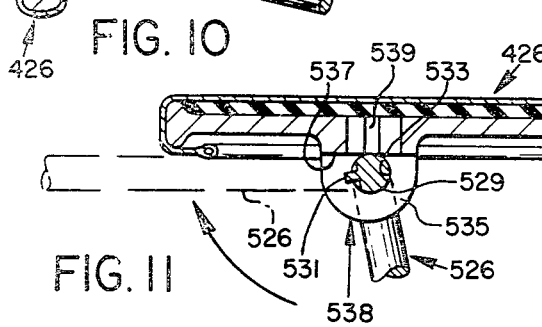
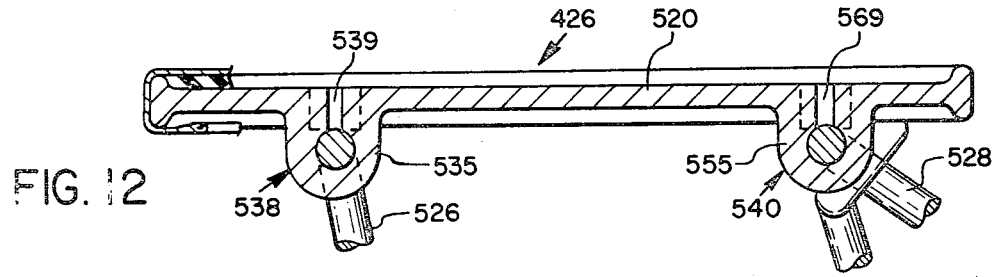
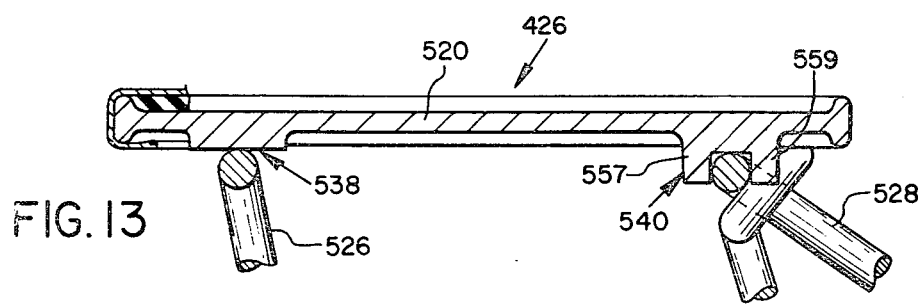

GOLF CLUB CARRIER

This is a continuation of application Ser. No. 844,066, filed Oct. 20, 1977, now abandoned, which is a division of Ser. No. 760,912, filed Jan. 21, 1977, now U.S. Pat. No. 4,136,724.

DESCRIPTION

This invention relates to an improved golf club carrier, and has for an object thereof the provision of a new and improved golf club carrier.

Another object of the invention is to provide a new and improved golf cart.

A further object of the invention is to provide a new and improved golf club container.

Another object of the invention is to provide a golf cart having a minimum of fasteners such as screws, rivets and the like.

Another object of the invention is to provide a golf cart with a simple, tubular frame comprising two generally U-shaped tubes having telescopic joints.

Another object of the invention is to provide a golf cart with a new and improved wheel suspension comprising a pair of axle carrying arms pivotal on a U-shaped frame and spring biased by a pair of torsion rods, secured to the arms and to the frame.

Another object of the invention is to provide a foldable golf cart having a link comprising a pair of rods having upper ends hooked into a foldable wheel suspending frame.

Another object of the invention is to provide a golf cart seat supported by two pairs of legs and a pair of braces slidable along one of the pairs of legs.

Another object of the invention is to provide a golf club container releasably latched to a golf cart frame in a position resting on a cross member of the frame.

Another object of the invention is to provide a golf club container having a compartment with a side opening and a pleated, flexible plastic separator in the compartment.

Another object of the invention is to provide a golf club container of rigid material having a front opening for irons and a plurality of rearwardly positioned long sockets for receiving shafts of woods.

In the drawings:

FIG. 1 is a perspective view of an improved golf club carrier forming one embodiment of the invention;

FIG. 2 is an enlarged, fragmentary, perspective view of a golf cart of the carrier of FIG. 1;

FIG. 3 is an enlarged, fragmentary, bottom plan view of a seat of the golf cart;

FIG. 4 is an enlarged, fragmentary, sectional view taken along line 4—4 of FIG. 2;

FIG. 5 is an enlarged, vertical sectional view of the carrier of FIG. 1;

FIG. 9 is a fragmentary, bottom plan view of a seat of an improved carrier forming an alternate embodiment of the invention;

FIG. 10 is a fragmentary, sectional view taken along line 10—10 of FIG. 9;

FIG. 11 is a fragmentary, sectional view taken along line 11—11 of FIG. 9;

FIG. 12 is a fragmentary, sectional view taken along line 12—12 of FIG. 9; and,

FIG. 13 is a fragmentary, sectional view taken along line 13—13 of FIG. 9.

Figure 6:
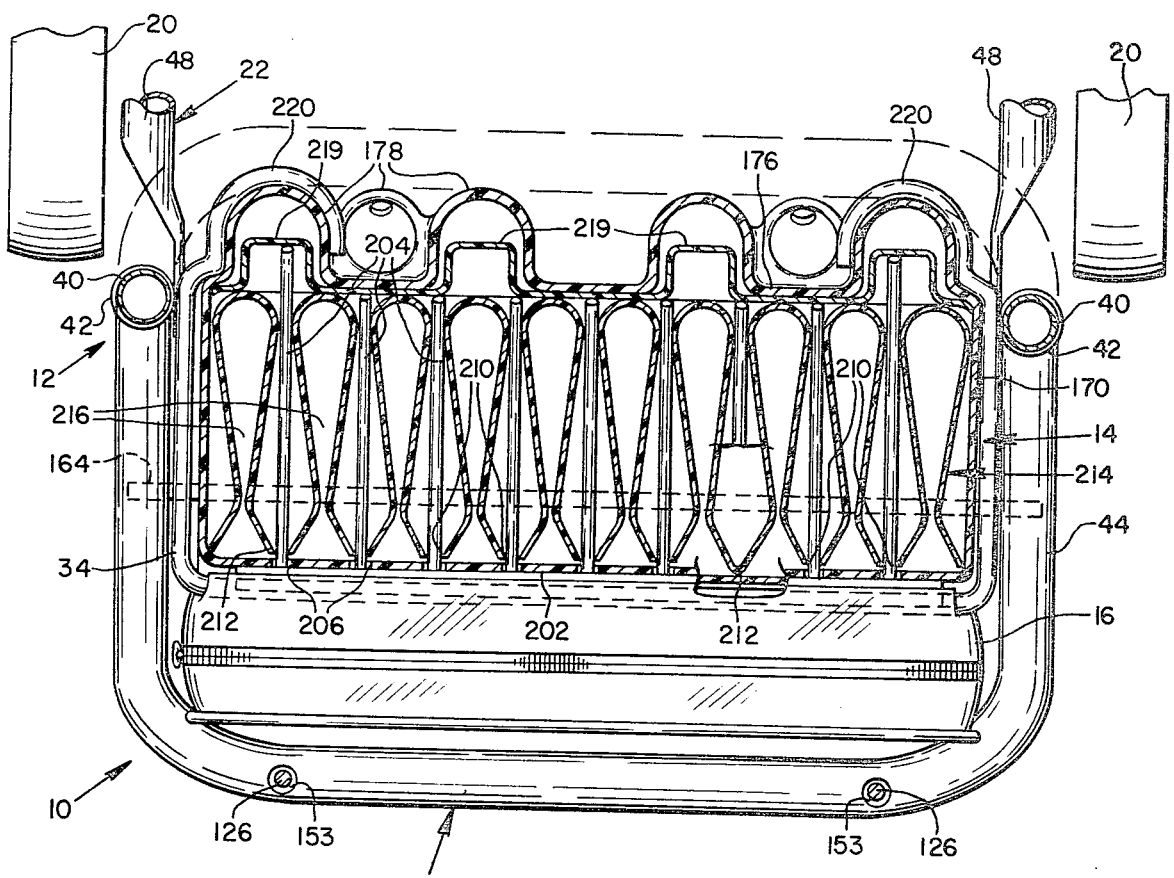
FIG. 6 is an enlarged, horizontal sectional view taken along line 6—6 of FIG. 5.
Figure 7:
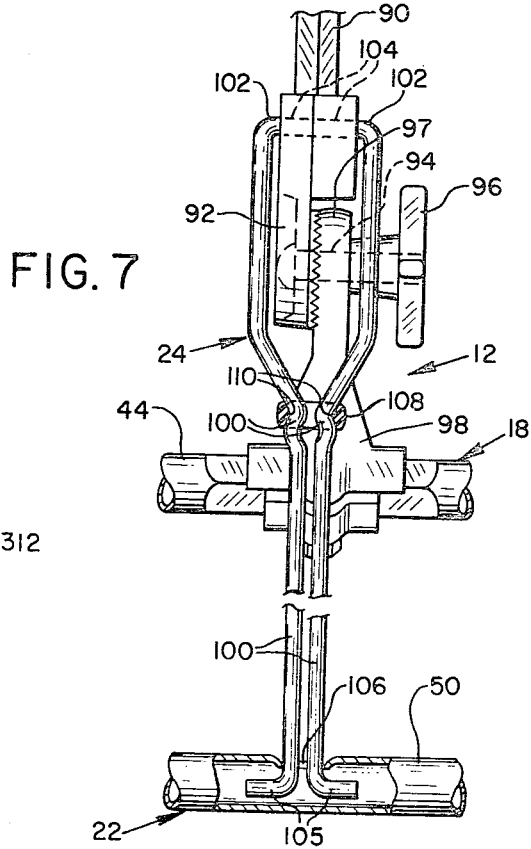
FIG. 7 is an enlarged, fragmentary, partially sectional view taken along line 7—7 of FIG. 5.
Figure 8:
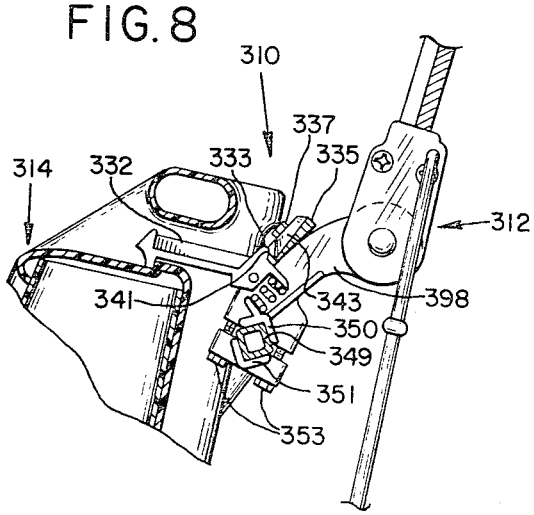
FIG. 8 is a fragmentary, vertical, sectional view of an improved carrier forming an alternate embodiment of the invention.

An improved carrier 10 forming one embodiment of the invention includes a cart 12, a container 14 and a pillow pocket unit 16 for carrying accessories. The cart includes a tubular frame or chassis 18, carried by wheels 20 through a folding resilient torsion bar suspension system 22 held by a handle actuated linkage 24 in either a stand fold condition as shown in broken lines in FIG. 5 or an open or running position as shown in full lines in FIG. 5. The cart also includes a seat 26 selectively movable between an operative position shown in full lines and a folded position shown in broken lines. The container 14 is adapted to grip irons 28 with their heads down and grip woods 30 with their heads up. The container is releasably held on the cart by a latching arm 32, and a wire loop 34 carries the pocket unit 16 and is carried by the container.

The frame 18 of the cart 12 is generally S-shaped in profile and includes an upper, generally U-shaped tube 40 whose lower end portions fit into enlarged, upper socket portions 42 of a lower, generally U-shaped tube 44 and are held therein by rivets 46, which also hinge arm portions 48 of a U-shaped tube 50 forming part of the wheel suspension system 22. The wheels 20 are rotatable on flanged bushings 52 (FIG. 4) of self-lubricating or low friction material mounted on axles 54 between washers 56 and split ring washers 58 fitting in grooves 60 in the axles. The axles are integral with legs 62 integral with T-shaped bushings 64. Hub caps 66 are secured to hubs 68 by capscrews 70. The bushings are rotatable on rods 71 extending into and welded to the base of the tube 50. The legs 62 are each resiliently pressed in a clockwise direction, as viewed in FIG. 2 by torsion bar rods 72 having outer, downwardly bent, end portions 74 fitting into sockets 76 of the bushings 64. The rods also have downwardly bent end portions 78 bearing against a clip 80 welded to the tube 50 and positioned between lugs 82 on the clip. The portions of rods 72 adjacent the end portions 78 thereof snap into a rolled or grooved portion 84 of the clip. A hole 86 is positioned in the central portion of the rolled portion 84.

The positions of the tube 50 and wheels 20 are controlled by a handle 90 clamped to a toothed rotor 92 pivotal on a bolt 94 when handnut 96 is loosened. The bolt 94 extends through a toothed portion 97 of a split clamp arm or block 98 clamped rigidly to the upper portion of the frame 18. The linkage 24 comprises rods 100 having bent over upper portions 102 extending into holes 104 in the arm and bent over or hook-like lower portions 105 positioned in the tube 50, the rods extending through a hole 106 in the tube 50. A strong rubber ring 108 holds the rods 100 together and is positioned in notch-like portions 110 formed in the rods. To assemble the rods 100, the ring is placed on the lower end of one rod, that rod is hooked in the tube 50 and its hole 104, the lower end of the other rod 100 is inserted through the ring 108, is hooked in the tube 50, and is positioned in its hole 104. Then, the ring 108 is slid up to the notch-like portions 110. The latching arm 32 (FIGS. 1 and 5) is pivotally mounted on a capscrew 109 passing through a hole in the block 98 and is urged toward a latching position by a spring 111. The arm 32 has a hook 113.

The seat 26 (FIGS. 3 and 5) includes a slightly upped cast metal base 120, cushion material 122 on its top, and a flexible covering 124. The seat is pivotally connected to pairs of rods 126 and 128 by washers 130, screws 132 screwed into tapped bores 134 in lugs 136 and lugs 138, 140 and 142. End lugs 143 and 145 limit lateral movement of the rods 126 and 128 inwardly toward the seat. The rods 126 are legs, and have short, right angled, end portions 144 trapped between the lugs 136 and 138 and the washers, and upset enlarged or headed portions 146 are formed on the ends of the rods 128. The rods 128 have similar upset enlarged or headed portions 148 on longer, right angled, end portions 150 trapped between the washers 130 and the lugs 136, 140 and 142. The lower ends of the rods 126 have hooked end portions 151 in the base of the tube 44, the rows extending through holes 153 in the top of the tube 44. The lower ends of the pair of rods 128 have right angled end portions 152 (FIG. 2) extending into and trapped in an aligned pair of holes 154 in the tubes 40 and 44, which serve as pivot points for the rods 128. Bracing rods or legs 156 have angled, eye portions 158 fitting loosely around and slidable along the rods 128 to and from corner portions 160 (FIG. 1). The rods 156 also have eye portions 162 at their lower ends which eye portions extend around a cross rod 164 whose end portions extend through aligned holes 166 (FIG. 5) in the tube 44. The seat 26 and its supporting structure just described are movable between a folded or storage position shown in broken lines in FIG. 5 to an operative or sitting position shown in full lines in FIG. 5. Gravity holds the seat in its sitting position, and, in its storage position, the legs 126 are in overcenter positions so that gravity acting on the rods 128 and legs 156 tends to swing the seat, and legs further overcenter to keep the seat and the legs folded.

The container 14 (FIGS. 1, 5 and 6) includes a hollow container body or shell 170 of the tough, rotor-molded high density polyethylene having a bottom 172 having a groove 174 receiving and resting on the rod 164 to support the container on the cart 12. The container shell also has a back wall 176 having fluted or semi-tubes 178 for receiving the handles of the woods 30, a top 180 of the container shell having rolled openings 182 aligned with the semi-tubes 178. The top also has a handle passage 184 with a stepped catch 186 over which the hook 113 is urged to releasably hold the container in engagement with the top of the tube 40.

A comb 200 (FIGS. 5 and 6) of semi-flexible polyethylene includes a grooved base 202 and rod-like fingers 204. The fingers 204 extend through holes 206 in front wall 208 of the shell 170 and through holes 210 in pleats 212 of a cushioning pleated divider 214 of a flexible sheet of polyethylene to position iron head and shaft receiving compartments 216. The fingers 204 also engage divider sheet 218 of polyethylene having resilient, cupped portions 219 projecting into the semi-tubes 178 to resiliently engage shafts 220 of the woods 30. The wire loop 34 has hooked portions 220 hooking over the outer two semi-tubes 178 and slidable up from bumps 224 when front portion of the wire loop is sprung upwardly out of the grooved base 202. The front portion of the wire loop extends through a sleeve portion 226 of the pocket unit 16 to support the pocket unit.

EMBODIMENT OF FIG. 8

A golf club carrier 310 forming an alternate embodiment of the invention is like the carrier of FIGS. 1–7 except that a latching arm 332 has a locking finger 333, and a locking disc 335 mounted rotatably on split clamp arm 398 by a capscrew 337 screwed into a tapped bore in the arm 398. The disc 335 has an increasing radius cam surface 339 under or behind the finger, and, when in the position shown, a larger radius portion 341 engages the finger 333 to positively lock the arm 332 in its locking position holding containers 314 on cart 312. The disc 335 also is rotatable to bring a small radius portion 343 adjacent the finger 333 to permit the arm to be moved to a container releasing position. The arm 398 is carried by a V-shaped jaw portion 349 clamped on tube 340 by a V-shaped jaw 351 secured by capscrews 353 to the jaw portion 349, the jaw portion and the jaw tending to make the engaged portion of the tube 340 square rather than cylindrical as is the rest of the tube 340.

EMBODIMENT OF FIGS. 9–13

A golf club carrier forming an alternate embodiment of the invention is like the carrier 10 except for the structure securing of a seat 426 to a pair of rods 526 and a pair of rods 528. The seat 426 includes a cast metal base 520 having integrally therewith a pair of lugs 538 and a pair of lugs 540. Each rod 526 has a leg portion 527 and a journaling and fastening portion 529 having a swaged carrier 531. To attach the rod 526 to the base 520, the end of the portion 529 is inserted into bore 533 of bearing portion 535 in a position in which the ear 531 clears a U-shaped boss portion 537 of the lug 538. This insertion is continued until the ear 531 engages the bearing portion. Then, the rod 526 is swung to the broken line position thereof of FIG. 11 in which the ear 531 is aligned with clearance slot 539 in the bearing portion 535, and then is pushed farther until the ear clears the bearing portion 535 and the end portion of the portion 529 sticks through bearing portion 543. The leg 526 then is swung back to its full-line position of FIG. 11 in which the ear 531 is trapped between the bearing portions 535 and 543. The lower end of the rod 526 then is secured to the cart frame like the securing of the lower end of the rod 156 (FIG. 2).

Each rod 528 has an end portion 549 having an ear 551 trapped between bearing portions 553 and 555 and positioned between posts 557 and 559. To disengage the rod (or insert it), with the lower end of the rod 528 unhooked from the frame of the cart, the rod 528 is pivoted to a position aligning the ear 551 with clearance slot 569 in the bearing portion 555 and then the portion 549 is moved endwise to move the ear 551 through the bearing portion 555.

I claim:
1. In a golf club carrier,
 a golf cart frame having base means and upright means, a seat,
 first leg means pivotally attached to the seat and pivotally attached to the base means,
 and second leg means comprising a rod pivotally attached to the seat at one end and pivotal on the upright means at its other end, and a brace slidable on the rod at one end of the brace and pivotal on the upright means at the other end of the brace,
 the leg means serving to mount the seat selectively in a sitting overcenter position and a folded overcenter position.
2. In a golf club carrier,
 an upright frame,
 a U-shaped member pivotally secured at its ends to the frame, a pair of arms pivotally mounted to the base of the member, a pair of axle means mounted on the arms, a pair of wheels mounted on the axle means, spring means comprising torsion bar means biasing the arms in a direction to bias the wheels downwardly relative to the member, the torsion bar means including a pair of rods fixed at inner ends to the member and having L-shaped outer ends secured to the arms, socket members on the arms receiving the end portions of the rods, and a bracket fixed to the U-shaped member having a rolled end portion forming a groove in which the inner end portions of the rods are held, and also having a pair of retaining lugs, the inner end portions of the rods being bent over and sitting between the retaining lugs.

3. In a golf club carrier, a frame comprising an endless member having a pair of upright portions forming the sides of the carrier, a bottom portion and a top portion;

the endless member comprising a pair of U-shaped tubes having end portions telescopically interfitting and received one within the other at a point of intersection;

a U-shaped member pivotally secured to the upright portions of the endless member adjacent its bottom portion;

pin means connecting the U-shaped member to the pair of U-shaped tubes, said pin means securing said tubes together at said point of intersection;

a pair of axles secured to the U-shaped member and mounting the wheels;

a pair of arms carrying the axles and pivoted on the U-shaped member;

torsion bar means connected to the arms and the U-shaped member; and means for securing a club container to the front of the frame.

4. The golf club carrier of claim 3 further comprising:

a seat; and leg means pivotally secured to the seat and pivotally secured to the endless member.

5. The golf club carrier of claim 4, wherein the leg means includes a rod having an end portion extending loosely through a hole in the tubular endless member and hooked therein.

6. The golf club carrier of claim 5, wherein said end portion of said rod is L-shaped.

7. The golf club carrier of claim 4, wherein the leg means include a pair of rods pivotally connected to the seat at their upper end, the lower end portions of the rods being generally L-shaped and extending loosely through holes in the tubular endless member.

8. In a golf club carrier, a frame comprising an endless member having a pair of upright portions, a bottom portion and a top portion, the endless member comprising a pair of U-shaped tubes;

wheel suspension means secured to the frame adjacent its bottom portion;

a pair of wheels mounted on said wheel suspension means at opposite ends thereof;

a pair of fastener members securing the tubes together and pivotally mounting the wheel suspension means, the fastener members being rivets, the end portions of the tubes telescopically interfitting and being received one within the other at a point of intersection through which point said rivets extend; and means for securing a club container to the frame.

9. In a golf club carrier, a frame comprising a tubular endless member having a pair of upright portions, a bottom portion and a top portion;

wheel suspension means secured to the frame adjacent its bottom portion;

a pair of wheels mounted on said wheel suspension means;

a seat having an upper surface and an under-surface opposed thereto;

leg means for supporting said seat, said leg means being pivotally secured at one end to the under-surface of the seat and pivotally secured at the other end to the endless member, the leg means comprising a pair of rods pivotally connected to the under-surface of the seat at their upper ends, the lower end portions of the pair of rods being generally L-shaped and extending through holes in the upright portions of the endless member;

a pair of bracing rods each having at one end eye portions slidable along the pair of rods and pivotally connected at their other ends to the frame, the bracing rods serving to mount the seat selectively in a sitting overcenter position and a folded overcenter position; and means for securing a club container to the frame.

* * * * *